United States Patent
Niederoest et al.

(10) Patent No.: US 6,734,220 B2
(45) Date of Patent: *May 11, 2004

(54) FINE CELL, HIGH DENSITY VISCOELASTIC POLYURETHANE FOAMS

(75) Inventors: Beat Niederoest, Marlton, NJ (US); Chiu Y. Chan, Wilmington, DE (US); Robert Mohr, Williamstown, NJ (US)

(73) Assignee: Foamex L.P., Linwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/229,334

(22) Filed: Aug. 27, 2002

(65) Prior Publication Data

US 2004/0044091 A1 Mar. 4, 2004

(51) Int. Cl.$^7$ .............................................. C08G 18/00
(52) U.S. Cl. ...................... 521/174; 521/126; 521/128; 521/130; 521/137; 521/170
(58) Field of Search ................. 521/126, 128, 521/130, 137, 170, 174

(56) References Cited

U.S. PATENT DOCUMENTS

| | | |
|---|---|---|
| 4,246,356 A | 1/1981 | Walmsley |
| 4,390,566 A | 6/1983 | Umezawa et al. |
| 4,554,295 A * | 11/1985 | Ridge, Jr. ................... 521/110 |
| 4,722,946 A | 2/1988 | Hostettler |
| 4,839,397 A | 6/1989 | Lohmar et al. |
| 4,980,386 A | 12/1990 | Tiao et al. |
| 5,189,747 A | 3/1993 | Mundy et al. |
| 5,378,733 A | 1/1995 | Bates et al. |
| 5,420,170 A | 5/1995 | Lutter et al. |
| 5,453,455 A | 9/1995 | Krueger et al. |
| 5,545,706 A | 8/1996 | Barksby et al. |
| 5,919,395 A | 7/1999 | Bastin et al. |
| 6,028,122 A | 2/2000 | Everitt et al. |
| 6,051,624 A | 4/2000 | Bastin et al. |
| 6,136,878 A | 10/2000 | Free et al. |
| 6,303,731 B1 | 10/2001 | Carlson et al. |
| 6,316,514 B1 | 11/2001 | Falke et al. |
| 6,337,356 B1 * | 1/2002 | Zaschke et al. ............. 521/174 |
| 6,346,559 B1 | 2/2002 | Thiele et al. |
| 6,372,812 B1 | 4/2002 | Niederoest et al. |
| 2002/0035165 A1 | 3/2002 | Bruchmann et al. |

FOREIGN PATENT DOCUMENTS

WO    WO 93 099 34    5/1993

OTHER PUBLICATIONS

Specialty Composites Corp. CONFOR Foam Data Sheet (1986).
J. H. Saunders & K.C. Frisch, *Polyurethanes*, Part II (1964), pp. 84–87.
*Encyclopedia of Polymer Science*, (John Wiley & Sons, 1988) V. 13, p. 267.
R.D. Duffy, et al., "Viscoelastic Slabstock Foam Fundamentals, Properties and Applications," Polyurethanes 94 (Oct. 9–12, 1994), pp. 661–663).

* cited by examiner

*Primary Examiner*—John M. Cooney, Jr.
(74) *Attorney, Agent, or Firm*—Connolly Bove Lodge & Hutz LLP

(57) ABSTRACT

Polyurethane foams formed at above atmospheric pressure conditions using methylene diisocyanate or a specific mixture of polyisocyanate and with a major portion of methylene diisocyanate (MDI) with a specific mixture of polyether and graft polyols produces high density viscoelastic foams with improved hand touch (surface smoothness) that better retain viscoelasticity over time. The foam-forming ingredients are mixed together and foamed at controlled pressures in the range 1.05 to 1.5 bar (absolute), preferably 1.1 to 1.3 bar (absolute).

18 Claims, 1 Drawing Sheet

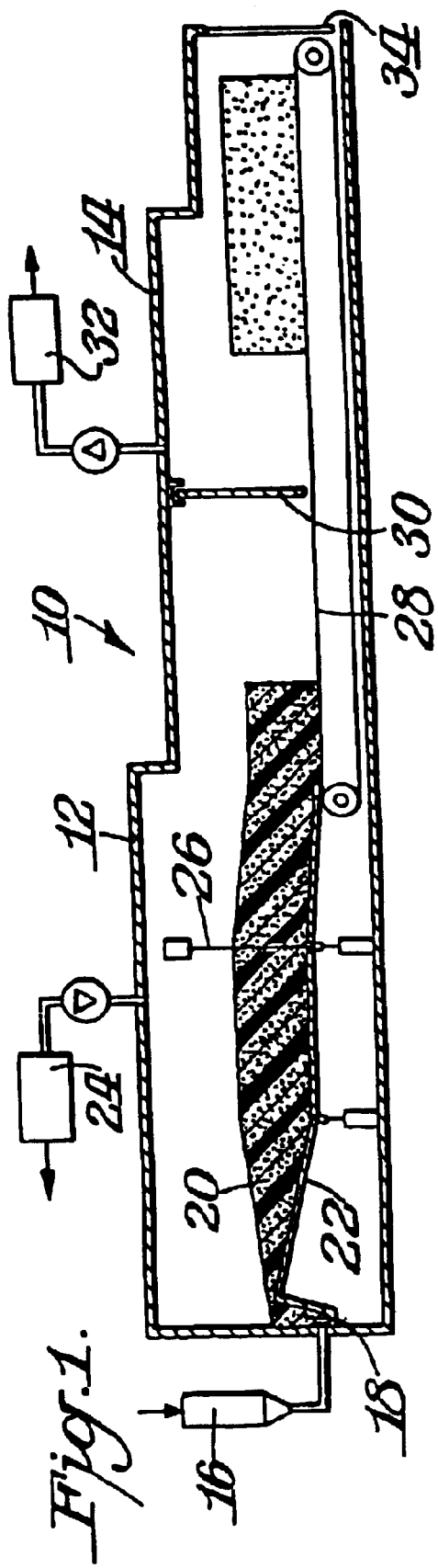

FINE CELL, HIGH DENSITY VISCOELASTIC POLYURETHANE FOAMS

This invention relates to flexible viscoelastic polyurethane foams used in bedding and furniture cushions. Produced at above atmospheric conditions from certain foaming mixtures, the foams of this invention provide improved retention of viscoelastic characteristics, improved hand touch and are more readily produced with conventional foaming equipment.

BACKGROUND OF THE INVENTION

Cellular polyurethane structures typically are prepared by generating a gas during polymerization of a liquid reaction mixture generally comprised of a polyester or polyether polyol, an isocyanate, a surfactant, catalyst and one or more blowing agents. The gas causes foaming of the reaction mixture to form the cellular structure. The surfactant stabilizes the structure.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, isocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and airtight doors are operated in a manner that allows for continuous production of slabstock polyurethane foam.

Polyurethane foams with varying density and hardness may be formed. Hardness is typically measured as IFD ("indentation force deflection"). Specifically, $IFD_{25}$ is the force required to compress the foam to 25% of its original thickness or height using the test method set out in ASTM D-3574. Tensile strength, tear strength, compression set, air permeability, fatigue resistance, support factor, and energy absorbing characteristics may also be varied, as can many other properties. Specific foam characteristics depend upon the selection of the starting materials, the foaming process and conditions, and sometimes on the subsequent processing. Among other things, polyurethane foams are widely used for bedding and furniture cushioning applications.

Viscoelastic polyurethane foams are characterized by high vibration damping, body conformance and slow recovery from compression. Viscoelastic foams have gained popularity for bedding applications because such foams are advertised as reducing pressure points, which are believed to cause tossing and turning during sleep.

All or almost all polyurethane foams undergo a transition from a rigid glass-like state to a soft rubber-like state. Over that transition, the foam is viscoelastic. For a typical slabstock polyurethane foam, the viscoclastic transition occurs at about −50° C., which is termed its glass transition temperature. Such a low glass transition temperature limits the usefulness of such foams for room temperature applications.

To obtain viscoclastic behavior in a polyurethane foam intended for room temperature applications, one possible approach is to shift the glass transition temperature nearer to room temperature by using a lower molecular weight polyol in combination with a lower isocyanate index. However, the low isocyanate index can result in a foam with poor fatigue resistance. To compensate for poor fatigue resistance, the industry trend has been to raise the density of the resulting foam. Yet increased density can cause significant processing difficulties where achieving increased density in conventional foaming processes usually requires lowering the water content, which leads to less urea formation and subsequently low foam permeability, and even shrinkage. Very often, to prevent shrinkage in higher density foams, cell openers are added to the foam-forming mixtures. But the resulting foams formed with a cell opener can have a coarse cell structure and a rough outer surface. Such a coarse structure and rough surface conflicts with consumer expectations for a generally fine cell structure with a smoother surface that is perceived to offer better comfort.

The polyurethane foaming reaction is exothermic. Another significant problem resulting from foaming with lower water content is that the reaction exotherm generally is reduced. Foam mixtures with higher water content require more isocyanate, and thus generate a greater amount of heat to promote the foaming reaction to completion. With a lower exotherm, the foam cure is slower, and may not be sufficiently complete at the end of the conveyor in a conventional slabstock foaming production equipment. The poor cure and the relatively low foam bun height profile make it difficult for the crane or handling equipment to pick up the foam bun from the end of the pourline conveyor to move the bun to a suitable location to complete the cure. If the foam bun is lifted prematurely, it can be damaged. In addition, in most cases, the bottom and sides of the foam conveyor in the pouring equipment are lined with plastic sheets to keep the rising foam mixture from sticking to the conveyor surface as it is conveyed away from the mix head or trough that introduces the foaming mixture onto the conveyor. A poor cure as experienced with foams produced at lower exotherms can result in a weak bond forming between the foam bun and the plastic sheets. When this occurs, the plastic sheet more easily delaminates from the foam, which can jam up the rollers in the conveyor and lead to a costly shutdown of the foam manufacturing process. To prevent these problems, the viscoelastic polyurethane foam bun frequently must be left on the pourline for a longer time, as long as 3 hours compared to about 5 minutes in conventional slabstock foam grades. These processing difficulties have made the viscoelastic foam very production-unfriendly.

Commercially available viscoelastic foams also have exhibited variable performance. Unfortunately, there is no ASTM or other standardized test for measuring foam viscoelasticity. One common way to quantify viscoelasticity is to measure the visco recovery time. In that measurement, a predetermined load is applied to the foam for a fixed amount of time, typically resulting in a significant indentation. After the load is removed, the time it takes the foam to recover to its original height or to a predetermined height is measured. A longer recovery time indicates a higher degree of viscoelasticity. The load size and shape and the foam shape geometry in such tests have not been standardized. The viscoelasticity measurement is further complicated because the viscoelasticity property does not remain constant, but tends to deteriorate over time in low-index foams. In general, the lower density products have a lower initial viscoelasticity and poorer retention of viscoelasticity over time.

High density viscoelastic foams with improved retention of the viscoelastic characteristics and improved hand touch that can be produced efficiently and economically are continually sought for bedding and furniture applications. The prior art does not disclose production-friendly methods for making high density, fine cell viscoelastic polyurethane foams.

SUMMARY OF THE INVENTION

According to the invention, flexible, fine cell, high density viscoelastic polyurethane foams with long recovery time and excellent retention of viscoelasticity are produced using a method comprising preparing a foam reaction mixture and foaming that mixture at above atmospheric pressure conditions, preferably at pressures in the range of 1.05 to 1.5 bar (absolute), most preferably 1.1 to 1.3 bar (absolute). The reaction mixture contains (a) a polyol mixture of (i) about 50 to 95 percent by weight total polyols of a polyether polyol having from 0 to 40 percent ethylene oxide groups, and having a hydroxyl number in the range of about 120 to 220 and a functionality from 2.7 to 3.3, and (ii) about 5 to 50 percent by weight total polyols of a graft polyol having a ratio of styrene to acrylonitrile of about 70 to 30, and having a hydroxyl number in the range of about 25 to 50 and a functionality from 2.5 to 3.0; (b) an organic polyisocyanate selected from the group consisting of methylene diisocyanate and methylene diisocyanate mixed with toluene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, wherein at least 50 percent of the methylene diisocyanate is 4,4' methylene diisocyanate, and wherein the isocyanate index is in the range of 70 to 95; and (c) from about 1.2 to 2.5 parts per hundred parts polyol of water as a blowing agent.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, and up to 0.3 to 2 parts per hundred parts polyol of a cross linking agent.

The resulting high density polyurethane foams have densities in the range of about 4 to 7 pounds per cubic foot, preferably about 4 to 5 pounds per cubic foot, a low surface roughness (preferably Ra under 0.20 mm as measured by perthometer), a high degree of initial viscoelasticity and excellent retention of viscoelasticity over time. In addition, such foams preferably have a finer cell size of about 70 pores per linear inch or finer.

DESCRIPTION OF THE FIGURES

FIG. 1 is a schematic drawing of an apparatus that may be used to form foams under controlled pressures above atmospheric pressure.

DESCRIPTION OF THE PREFERRED EMBODIMENT

Polyether polyols used to prepare flexible polyurethane foams typically have molecular weights between 500 and 7000. One example of these conventional polyols is VORANOL® 3010 from Dow Chemical, which has a hydroxyl ("OH") number of 56 mg KOH/g and a functionality of 2.9, with an EO content of 8.5%. To make a viscoelastic foam, it is often desirable to use a so-called "viscoelastic polyol". The viscoelastic polyols are characterized by high OH numbers of above 120 and tend to produce a shorter-chain polyurethane blocks with a glass transition temperature closer to room temperature. Examples of the higher-OH polyols are U-1000 from Bayer and G30-167 from Huntsman, both of which contain no EO.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea Graft or modified polyether polyols contain dispersed polymeric solids. The solids increase hardness and mechanical strength of the resultant foam. Especially preferred graft polyols in this invention are ARCOL HS-100 from Bayer AG or Dow VORANOL 3943.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

A preferred polyol combination for the invention has from 50 to 95% by weight conventional polyether polyol and 5 to 50% by weight graft polyol. The preferred polyether polyol has a functionality from 2.7 to 3.3 and hydroxyl number from 120 to 220. The polyether polyol should contain from 0 to 40% EO. The preferred graft polyol has a functionality from 2.5 to 3.0 and an hydroxyl number from 25 to 50. It should contain styrene and acrylonitrile in a ratio of about 70 to 30.

The amount of isocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range from 70 to 140. In this invention, the isocyanate index is below 100, and preferably the isocyanate index is in the range of 70 to 95.

Conventional polyisocyanates may be used in this invention. The preferred isocyanates are methylene diisocyanate (MDI), and mixtures of MDI with toluene diisocyanate (TDI). A well known toluene diisocyanate is TD80, a commercially available blend of 80% of 2,4 toluene diisocyanate and 20% of 2,6 toluene diisocyanate. A preferred methylene diisocyanate is S-7050 from Hunstman/ICI, which has a NCO content of 32.8% with over 50% 4,4'-methylene diisocyanate. Polyisocyanates are typically used at a level of between 20 and 90 parts by weight per 100 parts of polyol, depending upon the polyol OH content and the water content of the formulation.

Catalysts are used to control the relative rates of water-isocyanate (gas-forming) and polyol-isocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-isocyanate reaction, whereas the organotin catalysts are known to have a greater effect on the polyol-isocyanate reaction. Total catalyst levels generally vary from 0 to 5.0 parts by weight per 100 parts polyol. The amount of catalyst used depends upon the formulation employed and the type of catalyst, as known to those skilled in the art Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; and organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 2 parts by weight per 100 parts polyol of surfactant is preferred, and 1 part by weight per 100 parts polyol is most preferred.

A blowing agent may be included in the foam-forming composition. The most typical blowing agent is water that may be added in amounts from 1 to 2.5 parts per hundred parts polyol. Preferably, water as blowing agent is added in an amount suitable to achieve a desired foam density, and the amount may vary depending upon the operating pressure in the foaming chamber. We have found that at pressures in the range of 1.05 to 1.5 bar, from 1.2 to 2.2 parts per hundred parts polyol is an appropriate amount of water to achieve a foam with a higher density of about 4 to 5 pounds per cubic feet.

Cross-linking agents may be included in the foam-forming composition to enhance processing and foam stability. Typically, cross-linking agents are relatively small molecules containing 2 or 3 active hydrogen groups, and are added in amounts from 0 to 2 parts per hundred parts polyol. Representative cross-linking agents that may be included in the reaction mixture of the invention are diethanolamine (DEOA), ethylene glycol (EG), diethylene glycol (DEG), propylene glycol (PG), dipropylene glycol (DPG), 1,4-butanediol (BDO), commercially available Bayer AF DP1022 and R2580. Most preferably, the cross-linking agents are included in amounts from 0.3 to 0.5 parts per hundred parts polyol.

Optionally, other additives may be incorporated into the foam-forming composition. The optional additives include, but are not limited to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained above atmospheric pressure, preferably in the range of about 1.05 to 1.5 bar (absolute), most preferably 1.1 to 1.3 bar (absolute). The foams produced with the stated reaction mixtures at these reduced pressures have higher densities in the range of 4 to 5 pounds per cubic foot (lbs/ft$^3$ or pcf).

FIG. 1 shows in schematic an apparatus that might be used to practice the invention in a continuous process. The figure is taken from the disclosure in WO93/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22.

The foam rises as it is conveyed away from the trough. After the foam is completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues.

The invention is further illustrated, but not limited by, the following examples.

EXAMPLES

Most of the foams were prepared in commercial variable pressure foaming equipment such as shown in FIG. 1. The polyols, water, surfactants, catalysts and other additives were introduced to mixing head in a separate stream from the isocyanate. Once mixed together, the foaming mixture was introduced into the bottom of a trough and allowed to rise upwardly within the trough and pour onto flow plates leading to a conveyer. The pressure within the process chamber was controlled as shown in Table 1.

Certain of the foams were prepared batch-wise on a laboratory scale in a fixed head foam machine with the formulations listed in Table 1. The water, isocyanate, polyols, surfactants, catalysts and other additives were poured from the fixed mixing head into a box positioned inside a chamber under pressure. The pressure was maintained above atmospheric pressure by pumping air into the chamber. Using a pressure regulator, the pressure was maintained at the operating pressure while the foam was allowed to rise. In the case of foams made at 1 Bar pressure, the boxes were located outside the chamber as pressure control was not necessary.

IFD or "indentation force deflection" was determined in accord with a procedure similar, to ASTM D 3574. In this case, for IFD$_{25}$ foam was compressed by 25% of its original height and the force was reported after one minute. The foam samples were cut to a size 15"×15"×4" prior to testing.

Tear strength (pli), tensile strength (psi), elongation (%) also were measured according to the procedures set forth in ASTM D 3574. Air permeability was determined in cubic feet per square foot per minute for each sample using a Frazier Differential Pressure Air Permeability Pressure Machine in accord with ASTM 737.

The viscoelastic recovery time was measured by applying a load to compress a foam sample to 25% of its original height The original dimensions of the sample were 4"×4"×1". The foam was held at this 75% compression for five (5) seconds. After the load was removed, the time it took the foam sample recover to 90% of its original height (10% compression) was determined. The height recovery target was arbitrarily chosen to be within 10% of the original height since the full height recovery may take an impractically long time for viscoelastic foams. A longer recovery time indicates a higher degree of viscoelasticity.

To test the retention of viscoelasticity over time, the foam was compressed and decompressed for 12,000 cycles. Each foam sample was cut to a size of 6"×15"×1" to form a belt and was mounted onto a roller. As the roller was driven rotationally, the foam was then introduced into the nip between two rollers and continuously compressed between the two rollers at a rate of about 19 compressions per minute.

The sample foam recovery height after 12,000 cycles was then determined.

To quantify the hand touch, a perthometer was used to measure the surface roughness of the sample foams. Microscopically, the surface of any foam sample consists of a series of "hills" and "valleys". The "Ra" is the average height of these high and low points of the surface. A high Ra value indicates a rough surface, and a low Ra value indicates a smooth surface. The European standard DIN 4768 provides additional details of the surface roughness test. To prevent different surface smoothness measurements attributable to varying saws to cut samples, the samples were cut using the same saw.

Pore size is measured by counting the foam pores when the foam sample is held under a microscope. Pore sizes of 70 pores per linear inch or higher indicate a fine pore sizes. A foam with 65 pores per linear inch is "coarser" than a foam with 70 pores per linear inch.

not peel off from the bottom of the foam bun so that the foam bun from Sample A could be handled within the normal operating time of 5 minutes. Sample A also had a long initial visco recovery time of 15 seconds, which did not change even after 12,000 cycles of use.

In comparison, Example B used a conventional foaming process at atmospheric pressure, which required that the water level be reduced to 1.1 parts. Due to the lower water content, it was necessary to add a cell opening surfactant, L-5614, to the foaming mixture. Both Examples A and B used a blend of TDI and MDI, which offered excellent processing. Although the foam permeability and recovery were good for Example B, the surface was rough as indicated by a high Ra value of 0.76 mm.

In Example C, TDI only was used as the isocyanate. Due to the slower cure, the bottom plastic sheet peeled off the bottom of the foam bun, and it was necessary to leave the foam bun on the pourline for approximately 3 hours

TABLE 1

|  |  | A | B compare | C compare | D | E | F | G |
|---|---|---|---|---|---|---|---|---|
| Polyol | G30-167 | 80 | 80 | 80 | 80 | 80 | 72 | 65 |
| Polyol | HS-100 | 20 | 20 | 20 | 20 | 20 | 28 | 35 |
| Surfactant | L-618 | 0.5 | 0 | 0.4 | 0.5 | 0.5 | 0.5 | 0.5 |
| Cell-Opening surfactant | L-5614 | 0 | 0.5 | 0 | 0 | 0 | 0 | 0 |
| Amine | ZF123 | 0.18 | 0.18 | 0.35 | 0.18 | 0.18 | 0.18 | 0.18 |
| Amine | TD33A | 0.20 | 0.20 | 0.20 | 0.20 | 0.20 | 0.20 | 0.20 |
| Tin catalyst | T-9 | 0.02 | 0.02 | 0.06 | 0.02 | 0.02 | 0.02 | 0.02 |
| Stabilizer | DP-1022 | 1.0 | 1.0 | 1.0 | 0.8 | 0.8 | 0.8 | 0.8 |
| Blowing agent | Water | 1.22 | 1.22 | 1.5 | 1.22 | 1.3 | 1.3 | 1.3 |
| Isocyanate | TD80 | 4.0 | 4.0 | 33.8 | 4.0 | 4.0 | 3.8 | 3.7 |
| Isocyanate | MDI Suprasec 7050 | 35.9 | 35.9 | 0 | 35.9 | 36.3 | 34.5 | 33.0 |
|  | Index | 80 | 80 | 85 | 80 | 80 | 80 | 80 |
|  | Chamber Pressure (mbar) | 1200 | 1000 | 1000 | 1200 | 1050 | 1050 | 1050 |
|  | Density (pcf) | 4.9 | 3.9 | 4.1 | 5.0 | 4.1 | 4.1 | 4.1 |
|  | IFD$_{25}$ (lb) | 16 | 16 | 13 | 16 | 13 | 16 | 17 |
|  | Recovery time (sec) | 15 | 15 | 4 | 12 | 14 | 10 | 8 |
|  | Recovery time after 12,000 cycles (sec) | 15 | 15 | 2 | 12 | — | — | — |
|  | ½" perm. (cfm/ft$^2$) | 25 | 57 | 37 | 32 | 39 | 42 | 43 |
|  | Pore size (pores per inch) | 81 | 62 | 65 | 79 | 75 | 74 | 71 |
|  | Cell structure | Uniform | Non-uniform | Uniform | Uniform | Uniform | Uniform | Uniform |
|  | Surface roughness (mm) | 0.12 | 0.76 | 0.49 | — | — | — | — |
|  | Plastic peeled off from bottom of foam bun | NO | — | YES | NO | NO | NO | NO |

*Foams of Examples A and C to G were prepared in a commercial machine.

The polyols were obtained from the following suppliers: ARCOL® HS 100 from Bayer AG; and G30-167 from Huntsman. The surfactants L-618 and L-5614, and stabilizer DP-1022 were obtained from Crompton. The amine catalysts ZF123 and TD33A, the tin catalyst T-9 and the stabilizer DEA-LFG-85 were from Huntsman. MDI Suprasec 7050 was from Huntsman, and TD 80 was from Dow Chemical.

Referring to the data obtained in Table 1, we found that Sample A according to the invention had a high density (4.9 pcf) with a low Ra value of 0.12 mm indicating that its surface was very smooth and the hand touch was excellent. In addition, the bottom plastic sheet from the conveyor did (compared to 5 minutes for Example A) before the foam bun could be moved. Example C illustrates the processing difficulties encountered when using a more conventional foaming process to make a viscoelastic foam. Due to the lower density of Example C, the visco recovery time was shorter and the foam lost its viscoelasticity (50% reduction) after fatigue.

Therefore, the combination of foaming ingredients, particularly the use of MDI, and above-atmospheric pressure foaming in Example A produced a high density viscoelastic foam with improved retention of the viscoelastic characteristics, finer cell size, improved hand touch and reduced production problems. Comparable results were obtained for Examples D to G, which had varied formulations and chamber pressures within the invention. The surface roughness for Example D was not measured on the perthometer, but the sample had a good hand touch. The fatigue recovery and surface roughness were not measured and are not reported in Table 1 for Examples E, F and G. These foams also had a good hand touch.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for producing a viscoelastic polyurethane foam, comprising the steps of:
   (1) preparing a reaction mixture comprising:
      (a) a polyol mixture of (i) about 50 to 95 percent by weight total polyols of a polyether polyol having from 0 to 40 percent ethylene oxide groups, and having a hydroxyl number in the range of about 120 to 220 and a functionality from 2.7 to 3.3, and (ii) about 5 to 50 percent by weight total polyols of a graft polyol having a ratio of styrene to acrylonitrile of about 70 to 30, and having a hydroxyl number in the range of about 25 to 50 and a functionality from 2.5 to 3.0;
      (b) an organic polyisocyanate selected from the group consisting of methylene diisocyanate and methylene diisocyanate mixed with toluene diisocyanate, wherein at least 50 percent of the methylene diisocyanate is 4,4' methylene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, and wherein the isocyanate index is below 100; and
      (c) from about 1.2 to 2.5 parts per hundred parts polyol of water as a blowing agent; and
   (2) allowing said reaction mixture-to react while held at a pressure of about 1.05 to 1.5 bar (absolute) so as to form the viscoelastic polyurethane foam,
wherein the viscoelastic foam has a density of about 4 pounds per cubic foot or greater.

2. The method of claim 1, wherein the resulting polyurethane foam has a density in the range of about 4 to 7 pounds per cubic foot.

3. The method of claim 1, wherein the resulting polyurethane foam has a surface roughness (Ra) below about 0.20 mm.

4. The method of claim 1, wherein the resulting polyurethane foam has a cell size of about 70 pores per inch or finer.

5. The method of claim 1, wherein from about 50 to 70 percent by weight total polyols of a polyether polyol having 0 to 40 percent ethylene oxide groups, and having a hydroxyl number in the range of about 120 to 220 and a functionality from 2.7 to 3.3 is used to prepare the reaction mixture.

6. The method of claim 1, wherein the reaction mixture contains up to two parts by weight per hundred parts polyol of a cross linking agent.

7. The method of claim 1, wherein the reaction mixture contains up to two parts by weight per hundred parts polyol of a surfactant.

8. The method of claim 1, wherein the reaction mixture contains up to two parts by weight per hundred parts polyol of a catalyst.

9. The method of claim 1, wherein the reaction mixture contains up to two parts by weight per hundred parts polyol of an amine catalyst.

10. The method of claim 1, wherein the reaction mixture contains up to 0.5 parts by weight per hundred parts polyol of a tin catalyst.

11. The method of claim 1, wherein the reaction mixture does not contain any cell opening surfactants.

12. The method of claim 1, wherein the reaction mixture contains at most about 10 percent by weight of toluene diisocyanate.

13. The method of claim 1, wherein the isocyanate index is in the range of from about 70 to 95.

14. The method of claim 12, wherein the isocyanate index is in the range of from about 70 to 80.

15. The method of claim 1, wherein the viscoelastic foam has a viscoelastic recovery time from 90% compression to 10% compression of at least about 10 seconds.

16. A viscoelastic polyurethane foam produced according to the method of claim 1.

17. A pillow comprising in part a viscoelastic polyurethane foam produced according to the method of claim 1.

18. A mattress or mattress pad comprising in part a viscoelastic foam produced according to the method of claim 1.

* * * * *